Nov. 7, 1939.  A. W. SIMPSON  2,179,202

PIPE JOINT SEAL

Filed June 23, 1937

Inventor:
ALBERT W. SIMPSON,
by his Attorneys.

Patented Nov. 7, 1939

2,179,202

UNITED STATES PATENT OFFICE 2,179,202

PIPE JOINT SEAL

Albert W. Simpson, Dormont, Pa., assignor to National Tube Company, a corporation of New Jersey Application June 23, 1937, Serial No. 149,966

1 Claim. (Cl. 285—154)

This invention relates to pipe joint seals and more particularly to threaded pipe joint seals.

Threaded pipe joints are not fluid-tight, in spite of the fact that threading requirements and specifications have become extremely rigid and the fine degree of accuracy with which threads are made under present-day commercial threading practice. The use of a seal is particularly necessary where the joined tubular sections convey gases under high pressures. Many attempts have been made to render threaded pipe joints fluid-tight under heavy pressure but none have been made that would successfully and economically seal a standard pipe and coupling joint.

It is accordingly an object of the present invention to provide a fluid-tight threaded pipe joint.

A further object of the present invention is to provide a fluid-tight seal for threaded pipe joints.

The foregoing and further objects of the present invention will be apparent after referring to the drawing, in which.

Figure 1:
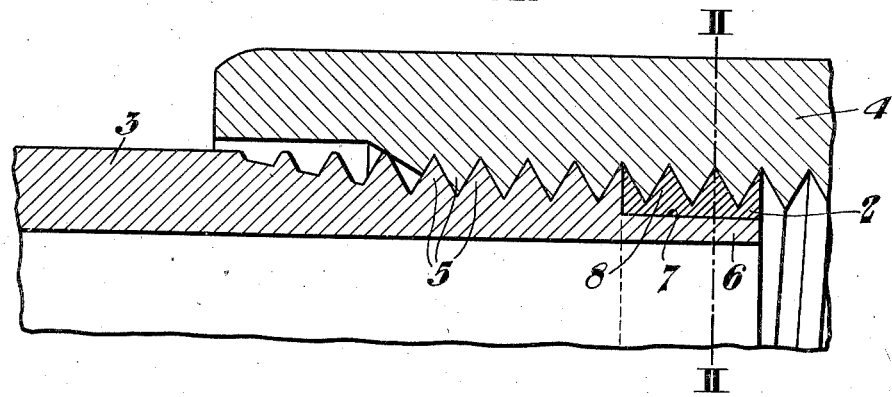
Figure 1 is a fragmentary sectional elevation.
Figure 2:
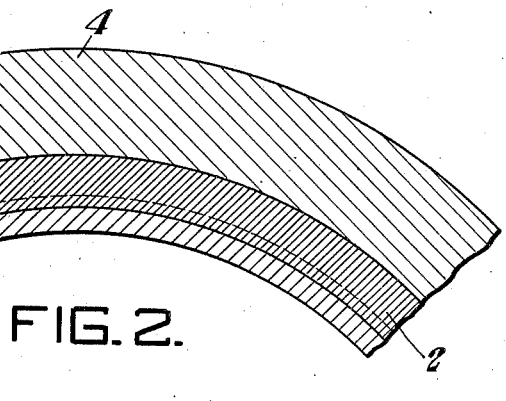
Figure 2 is a sectional view on the line II—II of Figure 1.

Referring more particularly to the drawing, the numeral 2 designates the threaded joint sealing gasket of my invention which is composed of a softer metal than the metal of tubular joint sections such as, for example, copper. The numerals 3 and 4 designate a pipe and coupling joined together by conventional tapered threads 5. As is shown in Figure 1 of the drawing, the pipe 3 has a slightly tapered unthreaded end portion 6 of substantially smaller diameter than the outside diameter of the pipe 3. The taper of the end section 6 should be substantially the same as the taper of the threads 5.

The inner surface 7 of the gasket 2 should have a slightly smaller diameter than the mean outside diameter of the tapered end portion 6. It is not necessary that the gasket 2 be tapered on either its interior or exterior surface as the pressure between the pipe 3 and coupling 4 in the assembled joint will cause it to conform to the taper of the pipe and coupling. The outside diameter or periphery of the gasket 2 is provided with screw-threads 8 of substantially the same pitch as the threads 5 and the overall diameter of the gasket, after being threaded, is substantially the same as the overall diameter of the threaded portion of the pipe 3 adjacent the unthreaded portion 6. Consequently the gasket 2 can be easily screwed several turns within the coupling 4 which will give ample space to insert the pipe 3 to start threading it therewithin. Upon continued screwing together of the pipe 3 and coupling 4, the gasket 2 will be screwed forwardly within the coupling by reason of the frictional engagement between it and the inner extremity of the pipe 3 until the gasket 2 is tightly engaged by the tapered threads of the coupling 4. As the resistance to further turning of the gasket 2 becomes greater than the frictional engagement between it and the pipe, the tapered portion 6 of the pipe will feed forwardly into the interior 7 of the gasket 2, thereby expanding the gasket into tighter engagement with the coupling until the gasket is disposed upon the tapered portion 6, this forming a fluid-tight seal between the threads 8 of the gasket 2 and the threads 5 of the coupling, and also between the interior 7 of the gasket 2 and the tapered portion 6 of the pipe 3, whereby the joint is effectually sealed. If further relative screwing of the pipe 3 and coupling 4 are necessary to seat them firmly together, the gasket 2 will be forced to move inwardly of the coupling by the relative movement of the pipe and coupling and, due to the taper of the threads 5, will thereupon become more tightly compressed between the threads 5 and the end 6 of the pipe 3. However, since the overall outside diameter of the gasket 2 is substantially the same as that of the inner end of the threaded portion of the pipe, it will become seated within the coupling and cease turning with the pipe being screwed thereinto at approximately its final position for, being composed of softer metal, it will tend to compress more readily than the pipe and thus be readily screwed slightly further into the coupling than the pipe. Hence, after the gasket has ceased to rotate with the pipe, the continued rotation of the pipe necessary to seat it firmly within the coupling will cause the tapered portion 6 to move into the interior of the gasket which will be expanded over the tapered portion 6. The gasket 2 will then be under high compression between the threads of the coupling 4 and the tapered portion 6 of the pipe, thereby forming an effective seal.

It will be noted that a specially machined coupling having a sealing member disposed within a groove therein, or threads machined to such a fine degree of accuracy that a gasket can be compressed between the ends of the pipe within a coupling or between the end of the pipe and a shoulder in the coupling, is not necessary but that the seal of my invention can be applied to any standard pipe joint by merely machining the end of the pipe to provide a tapered portion thereat. By the use of a sealing gasket, as described in conjunction with a pipe having an unthreaded and slightly tapered end portion, a seal will be effected at the end of the pipe at any position within the coupling where the threads of the pipe and coupling have become firmly seated. Due to the normal variations in dimensions of threaded pipe and coupling members, this seating position will vary within wide limits but, by following the teachings of my invention a positive fluid-tight seal will always be obtained in an extremely simple manner as compared to heretofore known methods.

This form of seal is particularly effective for joints subjected to great longitudinal stresses which sometimes cause the pipe and coupling member to be stretched. Even if this occurs in a joint of the present invention the effectiveness of the seal is not diminished as the gasket is still firmly compressed between the coupling and the tapered portion of the pipe despite a slight slippage between the gasket and the tapered portion of the pipe.

While I have shown and described a specific embodiment of my invention it will be understood that I do not wish to be limited exactly thereto, since various modifications may be made within the scope of the following claim.

I claim:

A threaded pipe joint comprising an internally threaded metallic tubular member and an externally threaded metallic tubular member adapted to telescope therewith, said externally threaded member having an unthreaded annular portion of reduced diameter adjacent its outer extremity, said unthreaded annular portion being frusto-conical toward the extremity of said externally threaded member and adapted for disposal within said internally threaded member, the threads of the internally threaded member and the threads of the externally threaded member being tapered and complementary to each other, and a metallic sealing gasket of softer metal than the metal of both the internally threaded member and the externally threaded member, said metallic sealing gasket being annular and provided with a bore of the same form as the frusto-conical portion of said externally threaded member, the perimeter of said metallic sealing gasket being prethreaded with the same pitch as the threads of the internally threaded member, the bore of said metallic sealing gasket being originally of slightly smaller diameter than the diameter of the frusto-conical portion of the externally threaded member, said metallic sealing gasket being adapted for expansion onto the frusto-conical portion of the externally threaded member by positioning the latter within the internally threaded member and rotating the same; whereby a fluid-tight seal is formed by the compression of the prethreaded metallic sealing gasket between the threads of the internally threaded member and the frusto-conical extremity of the externally threaded member.

ALBERT W. SIMPSON.